Nov. 23, 1965 G. C. STEER 3,219,426
APPARATUS AND METHOD FOR DRAWING GLASS TUBES, RODS, OR THE LIKE
Filed Sept. 14, 1961 2 Sheets-Sheet 1

INVENTOR.
GEORGE C. STEER
BY W. A. SCHAICH &
E. J. HOLLER
ATTORNEYS

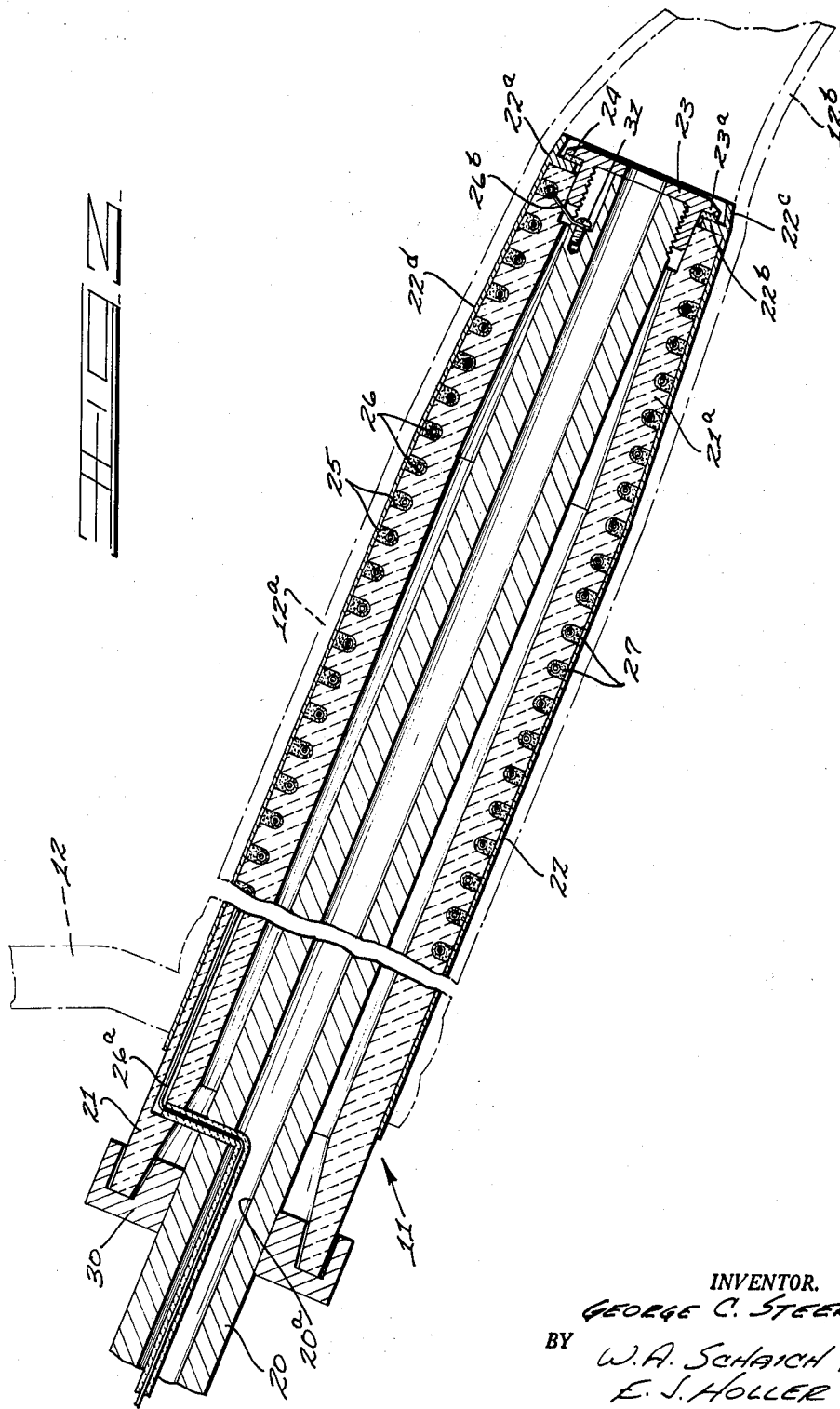

United States Patent Office 3,219,426
Patented Nov. 23, 1965

3,219,426
APPARATUS AND METHOD FOR DRAWING
GLASS TUBES, RODS, OR THE LIKE
George C. Steer, Vineland, N.J., assignor, by mesne assignments, to Owens-Illinois Glass Company, Toledo, Ohio, a corporation of Ohio
Filed Sept. 14, 1961, Ser. No. 138,112
15 Claims. (Cl. 65—89)

This invention relates to improvements in both apparatus and method for continuously drawing tubes, rods, or the like of glass or other thermoplastic material. More particularly, the invention pertains to novel apparatus and method for producing high-quality glass tubing and rod of various dimensions having improved physical characteristics.

The present invention is especially adapted for use in conjunction with apparatus such as that disclosed in Patent No. 1,219,709 to Danner, issued March 20, 1917, entitled "Apparatus for Forming Molten Material in Cylindrical Form." In such apparatus a supply stream of molten glass flows downwardly onto a continuously rotating downwardly-inclined tapered mandrel and either rod or hollow tubing is continuously drawn from the lower or discharge end of the mandrel. The working portion of the mandrel as well as the flowing supply stream and deposited glass surrounding the working portion of the mandrel are all enclosed in a heated chamber or muffle to control glass temperatures to obtain a uniform product.

Conventionally in the manufacture of glass rod or tubing as practiced by the Danner process, a tubular refractory sleeve is mounted on a metallic blowpipe which serves to permit the molten glass to flow thereon due to the rotation of the mandrel as well as the action of gravity in combination with lengthwise drawing of the material in a substantially horizontal direction. In the making of tubing the mandrel discharge end has a perforated tip which is employed as a blowpipe and in the making of rod, an imperforate tip is utilized having a conical shape at its lower extremity. Whether the nosepiece be fabricated of metal or refractory material such as fireclay, in virtually all forms of the Danner process the major exterior surfaces of the body portion of the mandrel have been comprised of inorganic refractory material such as a cast sleeve of fireclay.

Previously it has been observed that when molten glass passes over such sleeve, outgassing of the refractory material which comprises the mandrel exterior surfaces has been found to cause the formation of small open blisters on and in the glass in contact with the sleeve. As this glass passes over the discharge end of the sleeve and is drawn distendingly therefrom, these blisters tend to become elongated and form open so-called "air-lines." Such defects or the occurrence of any incipient devitrification in drawn tubing makes the same objectionable for use as syringer cartridges, culture tubes, etc., which are normally fabricated from lengths of high-quality tubing. Also during a long-term campaign of forming a single tubular product, for example, having precisely controlled internal and external diameters and truly cylindrical configuration, it has been observed that non-uniform wear of the mandrel refractory sleeve can cause both dimensional and shape variations in the product which must be corrected by modifying other variables where possible or by replacing the refractory sleeve. Such replacement involves a time-consuming operation, particularly in re-establishing proper thermally-balanced conditions within the muffle chamber.

Accordingly, it is an object of the present invention to overcome the above-noted deficiencies in glass drawing operations by the provision of a forming madrel having substantially imperforate exterior surfaces throughout its working region which are comprised of precious or noble metals or alloys thereof.

Another object of this invention is the provision of durable and long-lived apparatus which constitutes a novel rotary forming mandrel for continuously forming molten thermoplastic material into lengthy cylindrical contour in essentially defect-free condition.

Another object of this invention is to provide both apparatus and method for continuously drawing molten glass into various products having lengthy cylindrical contours by the use of a cylindrical mandrel having noble metal forming surfaces in its working region, which surfaces are temperature controlled to fabricate essentially defect-free products.

A further object of this invention is to provide apparatus for continuously drawing molten glass in the form of lengthy rod or tubing having improved physical characteristics, said apparatus comprising a downwardly-inclined rotating mandrel having glass-working surfaces which are fabricated of noble metal and means for internally heating the noble metal exterior surfaces to maintain the same at a precisely-controlled thermal level.

A still further object of this invention is to provide an improved method of drawing various glass products, such as rod or tubing, all having lengthy cylindrical contours utilizing a unitary forming mandrel, which has imperforate noble metal external surfaces and an electrical heating element mounted beneath said noble metal surfaces adjacent the discharge end of the mandrel to facilitate long-term drawing operations of an individual product having prescribed improved characteristics.

The specific nature of this invention, as well as other objects and advantages thereof, will become apparent to those skilled in the art from the following detailed description, taken in conjunction with the annexed sheets of drawings on which, by way of preferred example, only are illustrated the preferred embodiments in this invention.

In the accompanying drawings:

FIG. 3 is an enlarged vertical sectional view of the rotary forming mandrel only, fabricated in accordance with the present invention.

The present invention is particularly well adapted for use in connection with the apparatus disclosed in the above-identified patent to Danner, and the attached drawings indicate a preferred form of novel apparatus incorporated therein to accomplish the purposes set forth above. The apparatus is also applicable for use with other drawing processes and apparatus wherein various diverse types of lengthy glass products are formed by drawing molten glass downwardly or upwardly from the discharge end of a stationary or rotating end of a forming mandrel.

Figure 1:
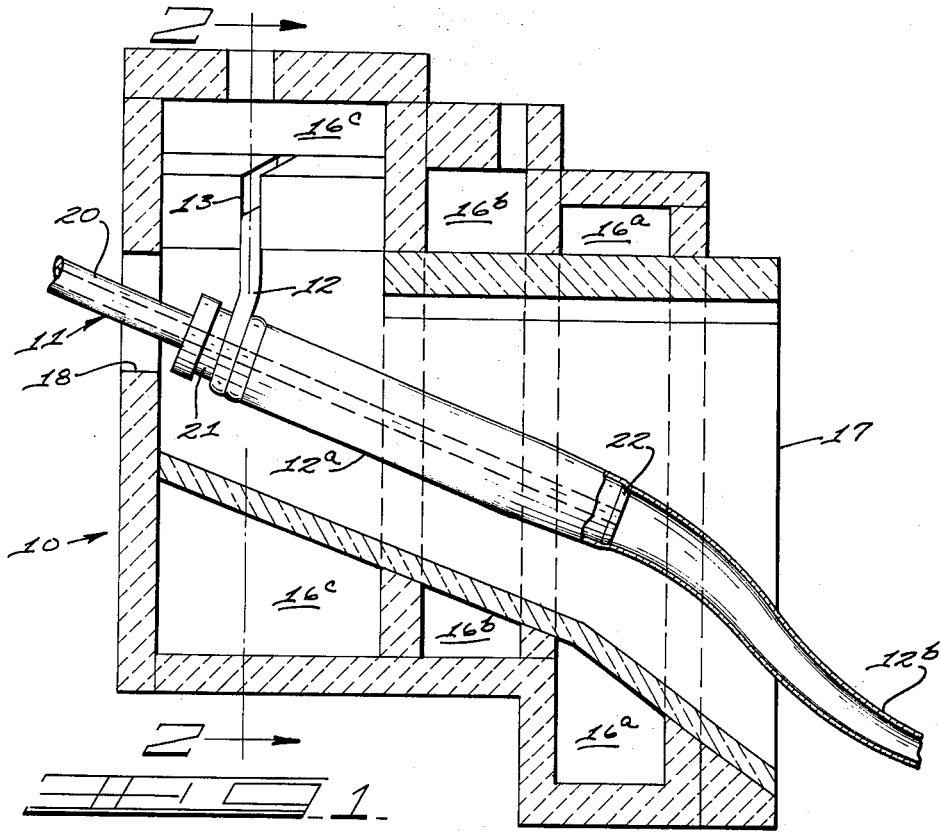
FIG. 1 is a vertical sectional view illustrating a rotating forming mandrel in one embodiment of the present invention incorporated in conventional glass drawing apparatus.
Figure 2:
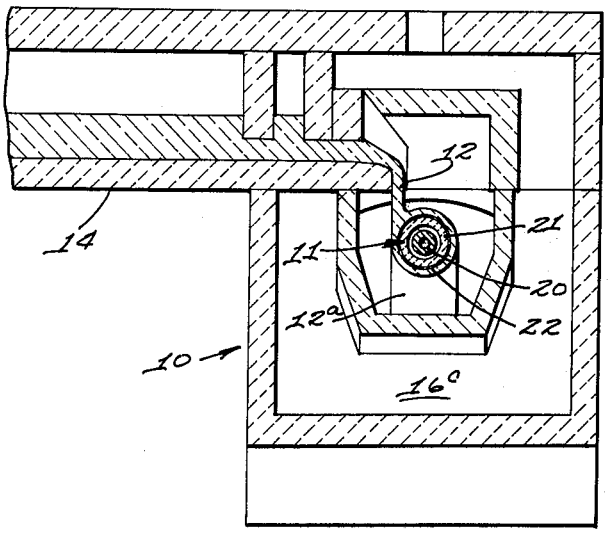
FIG. 2 is a vertical sectional view of reduced proportions taken along the line 2—2 of FIG. 1.

In accordance with FIG. 1, a muffle or chamber 10 encloses the usual downwardly-inclined rotating mandrel 11 upon the external surfaces of which molten glass flows, delivered thereonto in the form of a supply stream 12 from a delivery trough 13 positioned at the terminating end of a forehearth 14. Obviously the above-described elements can be varied widely as known in the art and may or may not consist of conventional structures.

Molten glass stream 12 is continuously deposited on rotating mandrel 11 and smoothly flows over its basically cylindrical surfaces in a helical and then cylindrical pattern and subsequently in a frusto-conical pattern. The glass is drawn in a constricting manner in catenary form from the discharge end of mandrel 11 at prescribed rates into cylindrical form comprising rod or tubing as set forth hereinbelow.

Forming chamber or muffle 10 which is normally fabricated or lined with refractory material is surrounded by a plurality of annular heating chambers 16a, 16b, and 16c which contains gas flames and/or products of combustion from burner fires to maintain uniform elevated temperatures within the chamber.

The discharge end 17 of the muffle from which the glass product is drawn may be generally open as shown or essentially fully enclosed except for a relatively small opening through which the glass product is drawn.

Mandrel 11 is mounted in downwardly-inclined cantilevered relation projecting through an opening 18 in the muffle chamber. The mandrel is rotatingly mounted exteriorly of the chamber and driven at a uniform rate of rotation by any one of various types of known conventional driving apparatus such as an electric motor and gear reduction box or the mechanism shown in the Danner patent.

Central blowpipe or body portion 20 of the mandrel which is normally fabricated of metal projects within the heated chamber and is surrounded by a lengthy cylindrical-shaped sleeve-like refractory member 21 having a slightly tapering lower extremity. The terminating end 22 of the mandrel may be provided with an axial opening to facilitate drawing regular or capillary tubing or a conically-shaped nosepeice having imperforate surfaces may be employed to draw solid rod or cane therefrom. As shown in FIG. 1, the molten glass 12a which is deposited on the mandrel is drawn therefrom in the form of tubing 12b.

As shown in FIG. 3, mandrel 11 consists essentially of a body portion 20 which is essentially a metallic tubular shaft with an axial opening 20a extending throughout its length. Cylindrical refractory sleeve 21, having a slightly tapering converging end portion 21a, is mounted on mandrel central shaft 20. A metallic ring 30 is firmly attached to body portion 20 and has an annular recess therein adapted to receive and retain the upper end of refractory sleeve 21 in coaxial alignment with the body portion. A cylindrical metallic sleeve 22 preferably fabricated of noble metal such as platinum, rhodium, or their alloys, for example, is mounted on refractory sleeve member 21.

Sleeve 22 is preferably fabricated of a noble metal such as an alloy comprised of 90% platinum and 10% rhodium by weight. Sleeve 22 has an internal contour which is closely complemental to the exterior surfaces of intermediate refractory sleeve 21. The terminating end 22a of noble metal sleeve 22 has an L-shaped cross-sectional contour with sufficiently heavy flange thicknesses to maintain its shape at the working temperatures of the glass including high-melting glasses such as borosilicates and aluminosilicates. The inwardly-projecting leg or flange 22b of the L-shaped end of the noble metal sleeve is held firmly in place against the lower edge of intermediate refractory sleeve 21. The longitudinally projecting flange 22c of the sleeve end portion provides frusto-conical surfaces which facilitate smooth departure of the glass from the mandrel discharge end.

A bushing 23 which is threaded onto the lower extremity of mandrel body portion 20 has an exteriorly-projecting flange 23a adapted to retain the noble metal sleeve in positive engagement with intermediate refractory sleeve 21. An annular ring 24 of insulating material such as asbestos is disposed between the exteriorly-projecting retention flange 23a of the bushing and the inwardly-projecting flange 22b of the external sleeve. With bushing 23 turned tightly into body portion 20, the assembly forms a rigid integral unit. Metallic external sleeve 22 must be maintained electrically insulated from heating element 26 to avoid shorting out of the latter and non-uniform temperature distribution in the external sleeve.

Intermediate refractory sleeve 21 is provided with a spiral-shaped recess 25 which extends substantially throughout the entire working region of the mandrel and preferably throughout its discharge end portion. Recess 25 opens exteriorly on the outer surfaces of refractory sleeve 21 and has an essentially uniform depth and spacing of its turns.

A helically-shaped electrical heating element 26 of the resistance type is mounted within spiral recess 25 with its turns spaced an essentially uniform distance beneath the external surface of external noble metal sleeve 22 and out of electrical contact therewith. Heating element 26 is retained permanently in place within the spiral recess by a surrounding layer 27 of refractory material such as Alundum cement, which fills the recess and maintains element 26 separated from noble metal sleeve 22. Heating element 26 is preferably comprised of a noble metal alloy such as 80% platinum and 20% rhodium by weight.

One end 26a of the heating element extends longitudinally of intermediate sleeve 21 and then interiorly of central metallic blowpipe 20 being maintained electrically insulated therefrom. This end of heating element 26 is then carried exteriorly of metallic blowpipe 20 through its axial opening 20a. The other end 26b of the heating element is connected to the lower extremity of metallic blowpipe 20 by a machine screw 31. Blowpipe 20 thus provides the other connection for supplying electrical energy to resistance-type heating element 26. An electrical slip-ring structure (not shown) is utilized to provide electrical energy to heating element 26 exteriorly of muffle chamber 10 during continuous rotation of the forming mandrel. When a given amount of current is supplied to heating element 26, the temperature level of the external surfaces of noble metal sleeve 22 can be controlled to provide a uniform elevated temperature sufficiently high to prevent devitrification of the glass product in contact therewith. It has been found that in drawing certain types of conventional glasses such as soda-lime and modified borosilicates into tubing, the exterior surfaces 22d of noble metal sleeve 22 should be maintained within a temperature range of from about 2100° to 2400° F.

Drawing of a cylindrical glass product in accordance with the present invention may be summarized described as follows:

With mandrel 11 mounted in downwardly-inclined fully-assembled relation, a supply stream 12 of molten glass is deposited on an upper cylindrical portion of external noble metal sleeve 22. The glass flows downwardly onto and around the mandrel during its rotation as a workable cylindrical body 12a and is drawn from the mandrel lengthwise either in tubular or rod-like form having a basically cylindrical configuration. In drawing a solid glass product, a mandrel nosepiece having a conical shape with imperforate surfaces is employed. In drawing various sizes of tubing, the terminating end of the mandrel consists of a short frusto-conical region having an axial opening to control the pressure of the atmosphere within the tubular product as drawn. In making capillary tubing, for example, reduced pressure less than atmospheric is employed in drawing such product, and in making regular tubing the atmosphere internally of the tube is maintained slightly greater than atmospheric by introducing low-pressure blowing air.

The present method consists of rotating downwardly-inclined forming mandrel 11 within a heating chamber and delivering a continuous stream of molten glass onto the mandrel while drawing a glass product into uniform cylindrical contour from the discharge end of the forming mandrel. In accordance with the present invention the mandrel is provided with imperforate surfaces comprised of noble metal such as platinum, rhodium, gold, silver, palladium, iridium, ruthenium, osmium, or alloys thereof, throughout its glass-contacting region. The external noble metal surfaces are maintained at a sufficiently elevated temperature by an internal heating element to minimize devitrification of the glass as drawn and to avoid outgassing of the mandrel forming surfaces.

Obviously, various sizes of rod and tubing are capable of being drawn in accordance with the present method by careful control of known variants such as the angle of inclination of the mandrel, glass temperatures and composition, and atmospheric temperatures within the muffle chamber as well as drawing rates.

Various modifications may be resorted to within the spirit and scope of the appended claims.

I claim:

1. In an apparatus for drawing thermoplastic material in cylindrical form, a hollow chamber, means for heating said chamber, a rotary mandrel mounted in downwardly-inclined relation within said chamber from which a cylindrical product of thermoplastic material is drawn, means for continuously flowing a stream of molten thermoplastic material onto and around the exterior of said mandrel, said mandrel having glass-contacting external surfaces and a circular cross-sectional configuration, the major portion of the glass-contacting external surfaces of said mandrel being comprised of noble metal, and independent heating means mounted interiorly of said glass-contacting external surfaces of said mandrel adapted to control the temperature thereof.

2. In an apparatus for drawing glass in cylindrical form, a hollow chamber, means for heating said chamber, a rotary mandrel mounted in downwardly-inclined relation within said chamber from which glass tube or rod is drawn, means for continuously flowing a stream of molten glass onto and around the exterior of said mandrel, said mandrel having a cylindrically-shaped body portion comprised essentially of a heat-resistant refractory member and a surrounding noble metal external sleeve, the latter extending substantially throughout the glass-contacting region of said mandrel and providing glass-contacting forming surfaces, an electrical heating element mounted entirely within said refractory member beneath said noble metal external sleeve, and means for supplying electrical energy to said electrical heating element.

3. An apparatus for drawing glass in cylindrical form in accordance with claim 2, the discharge end portion of said mandrel terminating in a frusto-conical shaped contour having an axial opening.

4. An apparatus for drawing glass in cylindrical form in accordance with claim 2, the discharge end portion of said mandrel terminating in a relatively short-length frusto-conical-shaped region, said mandrel having an axial opening extending therethrough, and means for introducing pressurized fluid through the axial opening of said mandrel to form a tubular glass product as drawn.

5. An apparatus for drawing glass in cylindrical form in accordance with claim 2, the said surrounding external sleeve of noble metal being comprised of platinum-rhodium alloy.

6. An apparatus for drawing glass in cylindrical form in accordance with claim 2, the said heating element consisting of an electrical resistance wire wound in a helical pattern around and disposed in a complemental recess within said heat-resistant refractory sleeve.

7. An apparatus for drawing glass in cylindrical form in accordance with claim 2, wherein the said external sleeve of noble metal has smooth imperforate surfaces extending lengthwise throughout the glass-contacting region of said mandrel and an axial opening at the discharge end of said mandrel, and means connected to said axial opening adapted to control the internal pressure within a tubular product as drawn.

8. In an apparatus for drawing glass in lengthy cylindrical form, a rotatable forming mandrel onto and around which molten glass is permitted to flow externally and lengthwise from which it is drawn in cylindrical form, said mandrel having a circular cross-sectional configuration and external surfaces throughout its glass-contacting region comprised of noble metal, a resistance-type electrical heating element mounted in a helical pattern beneath and spaced interiorly of said noble metal external surface in the glass-contacting region of said mandrel, and means for supplying electrical energy to said electrical heating element to control the temperature of said noble metal surfaces of said mandrel.

9. In an apparatus for drawing glass in lengthy cylindrical form, a forming mandrel onto and around which molten glass is permitted to flow and lengthwise from which it is exteriorly drawn in cylindrical form, said mandrel consisting essentially of a central metallic blowpipe element, an intermediate sleeve comprised of heat-resistant ceramic material surrounding said metallic blowpipe element and a noble metal sleeve surrounding said intermediate sleeve extending throughout the glass-contacting region of said mandrel, said intermediate sleeve having a spiral-shaped recess extending throughout a major portion of said glass-contacting region of said mandrel, a resistance-type electrical heating element disposed within said spiral-shaped recess spaced-apart from said noble metal sleeve, and electrical leads connected to said heating element to supply electrical energy to said heating element to control the surface temperature of said noble metal external sleeve.

10. The method of producing drawn glass products in lengthy cylindrical form including the steps of rotating a downwardly-inclined rotary forming mandrel within a heated chamber, delivering a stream of molten glass onto said rotating mandrel, drawing said glass in cylindrical form from the discharge end of said forming mandrel, providing said mandrel with external surfaces of noble metal extending throughout its glass-contacting region, and controlling the temperature of the noble metal external surfaces of said mandrel during drawing operations by the internal application of heat beneath said noble metal external surfaces.

11. The method in accordance with claim 10, including the step of heating the said noble metal external surfaces of said mandrel with an internal electrical heating element mounted therebeneath.

12. The method in accordance with claim 10 including the step of controlling the temperature of the noble metal external surfaces of said mandrel with a resistance-type electrical heating element mounted therebeneath, and maintaining the said noble metal external surfaces electrically insulated from said heating element.

13. The method in accordance with claim 10 including the step of maintaining the noble metal external surfaces at the discharge end of said mandrel at a sufficiently elevated temperature to minimize devitrification of the glass product as drawn.

14. The method of drawing a glass product in lengthy cylindrical form such as rod or tubing including the steps of rotating a downwardly-inclined rotary forming mandrel within a heated chamber, delivering a continuous stream of molten glass onto said rotating mandrel, drawing said glass in uniform cylindrical form from the discharge end of said forming mandrel, providing said mandrel with imperforate noble metal exterior surfaces throughout its glass-contacting region except for its terminating area, and maintaining the temperature of said noble metal exterior surfaces at a sufficiently elevated temperature by internal electrical heating to minimize devitrification of the glass product as drawn.

15. The method of drawing a glass product having lengthy cylindrical form such as rod or tubing including the steps of rotating a downwardly-inclined rotary forming mandrel within a heated chamber, delivering a continuous stream of molten glass onto said rotating mandrel, drawing said glass in uniform cylindrical form from the discharge end of said forming mandrel, providing said mandrel with imperforate exterior surfaces comprised of platinum-rhodium alloy throughout its glass-contacting region, and internally heating by electrical means the exterior surfaces of said mandrel to maintain the same at a sufficiently elevated temperature to minimize devitrification of the glass products as drawn.

References Cited by the Examiner

UNITED STATES PATENTS

| | | | |
|---|---|---|---|
| 1,637,458 | 8/1927 | Schoomenberg | 65—187 X |
| 1,977,956 | 10/1934 | Soubier | 65—89 |
| 2,106,527 | 1/1938 | Hostetter | 65—374 |
| 2,460,547 | 2/1949 | Stevens | 65—374 |
| 2,765,586 | 10/1956 | Wilson | 65—187 |
| 2,973,283 | 2/1961 | Hill | 65—374 X |

DONALL H. SYLVESTER, *Primary Examiner.*